No. 709,796. Patented Sept. 23, 1902.
D. C. RIPLEY.
METHOD OF MAKING HOLLOW GLASS ARTICLES.
(Application filed Oct. 22, 1901.)
(No Model.)
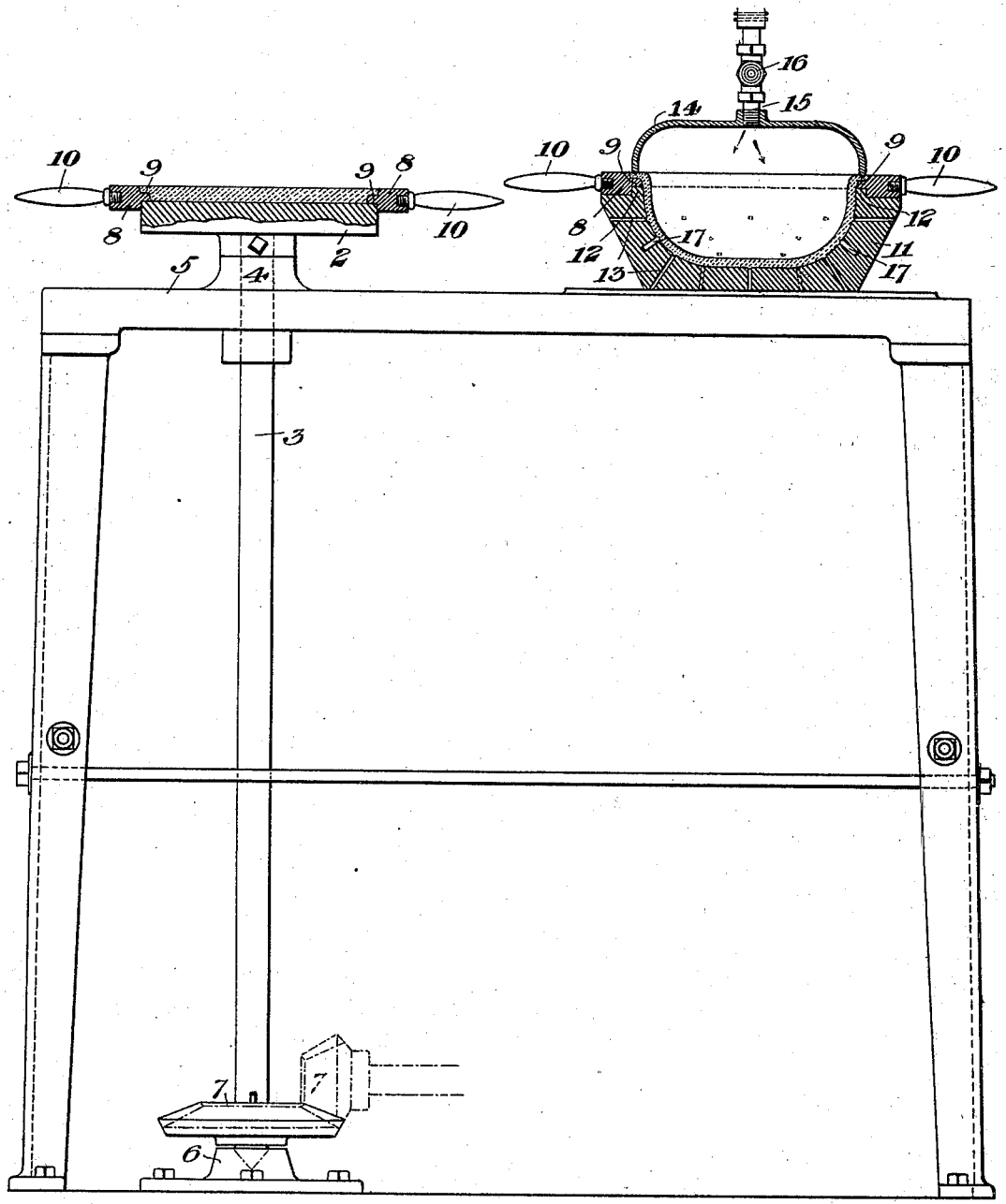
WITNESSES
INVENTOR

UNITED STATES PATENT OFFICE.

DANIEL C. RIPLEY, OF PITTSBURG, PENNSYLVANIA, ASSIGNOR TO UNITED STATES GLASS COMPANY, OF PITTSBURG, PENNSYLVANIA, A CORPORATION OF PENNSYLVANIA.

METHOD OF MAKING HOLLOW GLASS ARTICLES.

SPECIFICATION forming part of Letters Patent No. 709,796, dated September 23, 1902.

Application filed October 22, 1901. Serial No. 79,511. (No model.)

*To all whom it may concern:*

Be it known that I, DANIEL C. RIPLEY, of Pittsburg, Allegheny county, Pennsylvania, have invented a new and useful Method of Making Hollow Glass Articles, of which the following is a full, clear, and exact description, reference being had to the accompanying drawing, forming part of this specification, in which the figure is a sectional side elevation showing a preferred form of apparatus for carrying out my new process.

My invention relates to the formation of hollow glass articles, and more especially to the formation of blanks for cut-glass articles, though it may be employed for making other hollow glass articles, and it is designed to cheapen the production of such articles and increase the output and also to do away with the highly-skilled labor heretofore necessary in this art and to reduce the amount of waste in the glass.

In the drawings, 2 represents a circular metal base-plate secured to the upper end of the vertical shaft 3, extending through a bearing 4 on the table 5 and having a lower step-bearing 6. This shaft may be driven through any suitable connection, such as bevel-gearing. (Shown at 7.)

8 is a ring which is arranged to fit neatly about the base-plate and is provided with an intermediate inwardly-projecting rib 9, which rests upon the top of the base. The inner periphery of the rib and also the upper part of the ring are preferably beveled slightly, as shown, and the ring is provided with suitable handles 10.

A blow-mold 11 is placed upon the table adjacent to the rotary casting-plate and is provided with an annular projection or rib 12, around which the ring 8 fits, the upper end of the blow-mold cavity being preferably of the same size as the inner perimeter of the ring. The blow-mold is provided with small holes 13 to allow exit of the air, and these holes are preferably of such a size that the glass will enter them slightly and form small projections upon the outer surface of the blank. These projections are arranged according to the desired pattern to be cut upon the blank and greatly assist the operator in laying out the design upon the blank. Pins 17 may be used in the mold which form small indentations for the same purpose.

14 is a circular cap having an air-inlet pipe 15, controlled by valve 16, and to which compressed air is led by a flexible hose or other suitable connection. This cap is preferably provided with a V-shaped or sharpened lower edge and is arranged to sit upon that portion of the glass which is above the annular rib 9.

In carrying out my improved process I place the ring upon the rotary base and place the glass upon the base. This base being rotated will assist in spreading the glass by centrifugal force, and the glass is spread into the form of a circular plate with its upper surface above the rib of the ring, as shown. As soon as this operation is accomplished the ring with the contained glass plate is lifted and set upon the blow-mold. The cap is then set upon the glass and may be either of sufficient weight to enter it slightly or may be pressed down, the object being to seal the joint and prevent any substantial leakage of air therethrough, the plastic glass forming the jacket. Air is then fed into the cap under pressure and forces the glass downwardly and expands it within the matrix-cavity of the blow-mold. The cap is then removed, the ring lifted, and the blank removed from it.

The steps are easily and quickly carried out, and the resulting blanks are uniform in size and shape and are obtained without the use of the skilled labor heretofore necessary. It will be noted that no forming-surface is brought into contact with the upper face of the glass during the process. This prevents the usual chilled glass layer and gives a fine inner surface to the article. The small external projections or indentations on the blank greatly aid in the laying out of the patterns.

When the article is removed from the mold, a pattern is cut thereon, using the projections or indentations as guides therefor. I am aware that articles have been made by forming glass into a flat blank or plate on a perforated surface and then expanding the blank into hollow form by air forced through said perforations; but in my process the plate-like blank is placed over the matrix-cavity with the side which was in contact with the forming-surface next to the cavity, so that when expanded into the latter the side which was out of contact with the forming-surface and which is therefore unmarred shall constitute the inner side of the blown article and shall present a fine finish. The glass may be spread within the ring without rotating the base, and the apparatus may be widely varied in other ways without departing from my invention.

I claim—

1. The method of forming a blank for cut-glass articles, consisting in expanding glass within a mold and simultaneously forming small projections or indentations upon its exterior, and then cutting a pattern thereon using said projections or indentations as guides; substantially as described.

2. The method of forming hollow glass articles, consisting in feeding glass upon a base within a frame, rotating the base and spreading the glass within the frame, bringing the frame with the contained glass plate into opposition to a mold, and forcing the plate into the mold-cavity; substantially as described.

3. The method of forming hollow glass articles, consisting in spreading plastic glass into plate form with one face out of contact with any forming-surface, and then forcing the glass plate while still plastic into a matrix with the side of the plate which was in contact with the forming-surface directed toward the matrix; substantially as described.

In testimony whereof I have hereunto set my hand.

DANIEL C. RIPLEY.

Witnesses:
GEO. B. BLEMING,
L. M. REDMAN.